Figure 1:
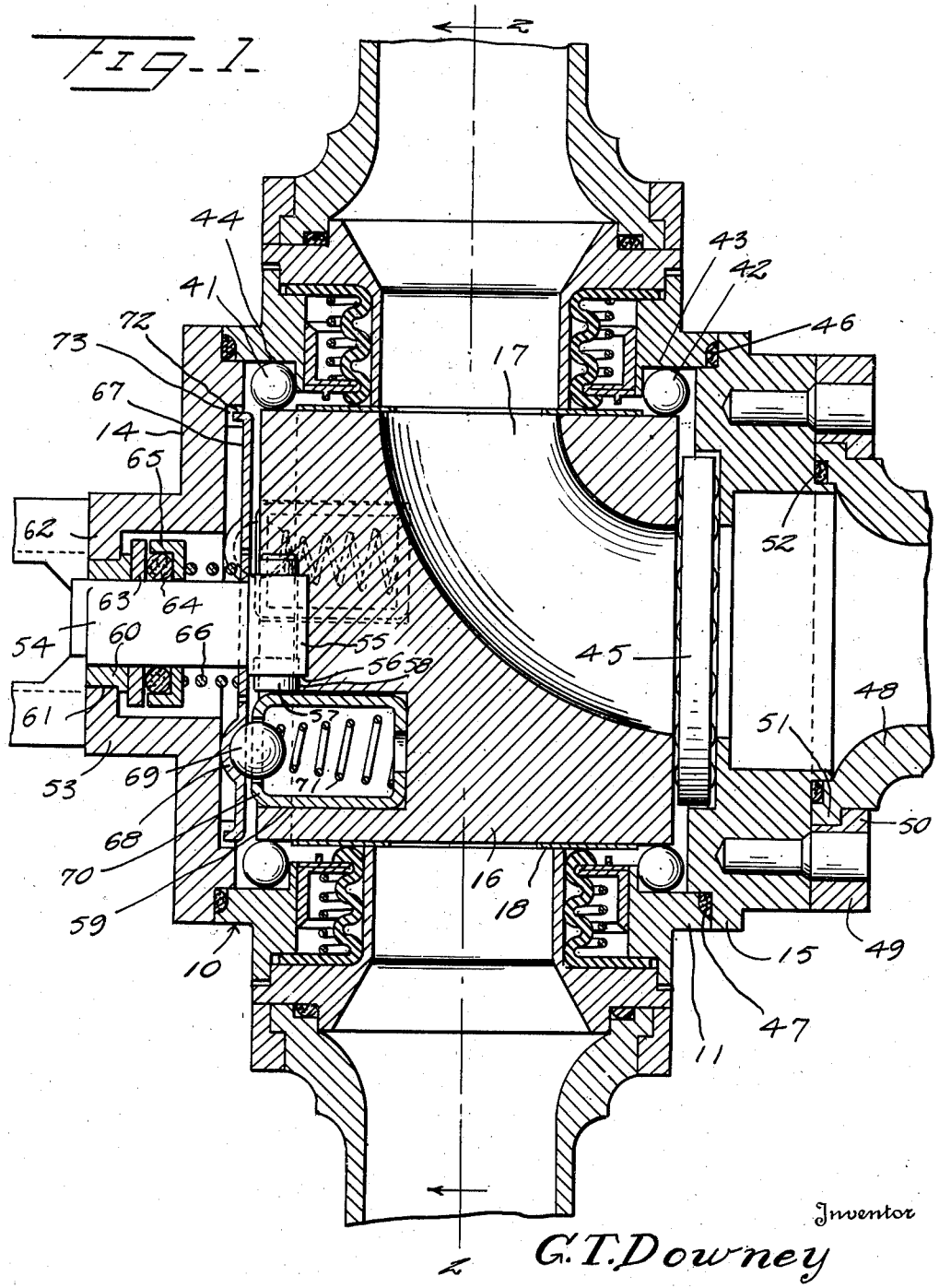

May 31, 1949.    G. T. DOWNEY    2,471,941
VALVE AND LINER THEREFOR
Filed May 29, 1944    2 Sheets-Sheet 1

Inventor
G. T. Downey
By Kimmel & Crowell
Attorneys

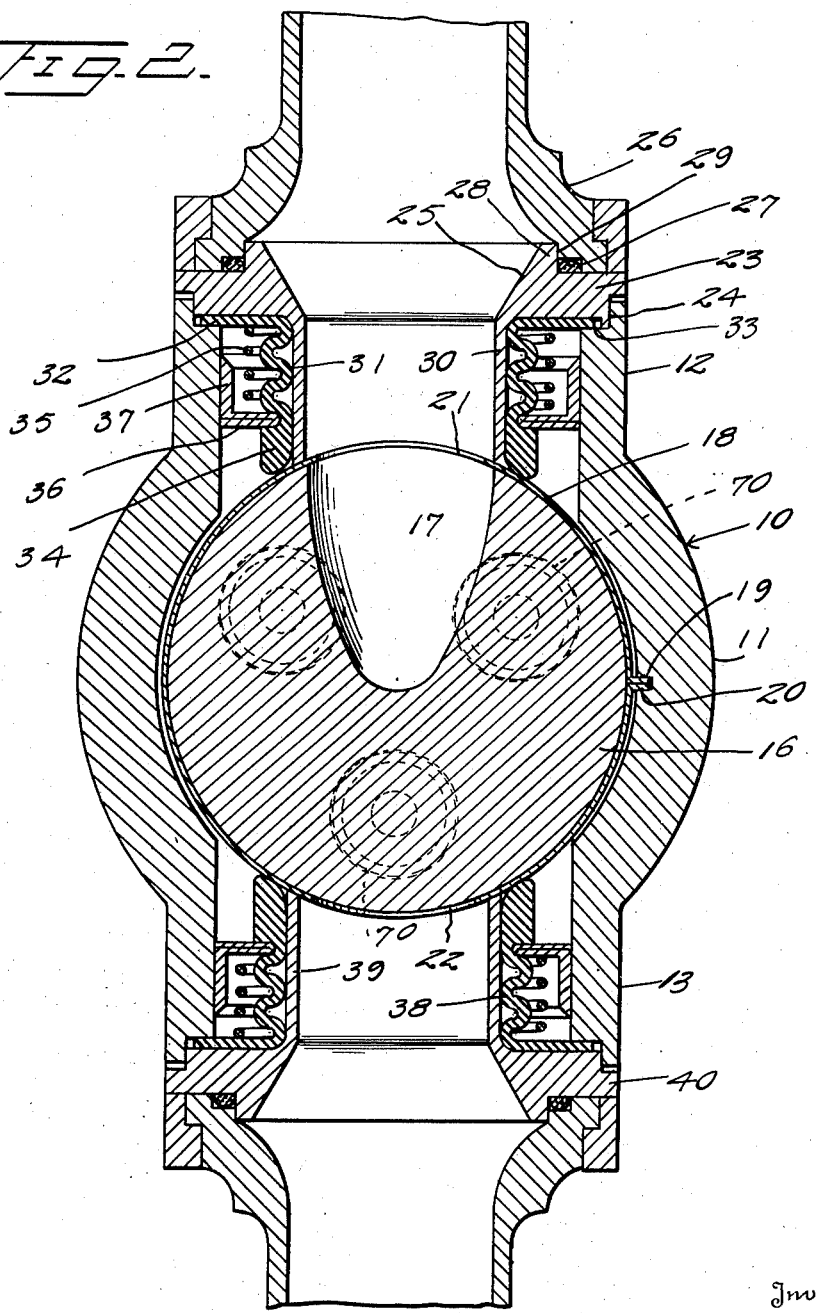

Patented May 31, 1949

2,471,941

UNITED STATES PATENT OFFICE 2,471,941

VALVE AND LINER THEREFOR

George T. Downey, Corry, Pa., assignor to Aero Supply Mfg. Co. Inc., Corry, Pa.

Application May 29, 1944, Serial No. 537,902

3 Claims. (Cl. 251—113)

This invention relates to a multi-port fluid valve.

An object of this invention is to provide an improved means for sealing the plug in the valve housing so as to eliminate the necessity of machining the plug opening to close tolerances.

Another object of this invention is to provide in a valve housing an improved liner which is formed of thin metal so that the liner may be held in sealing contact with the plug only at the radial ports.

A further object of this invention is to provide an improved valve housing and a liner therefor, including an improved means for holding the liner against circumferential movement.

A further object of this invention is to provide in a valve housing a removable or replaceable liner so that a worn or damaged liner can be easily replaced and the valve structure put back into its original condition.

With the foregoing objects and others which may hereinafter appear, the invention consists of the novel construction, combination and arrangement of parts as will be referred to and illustrated in the accompanying drawing, wherein is shown an embodiment of the invention, but it is to be understood that changes, modifications and variations may be resorted to which fall within the scope of the invention as claimed.

In the drawings:

Figure 1 is a vertical section partly broken away of a valve constructed according to an embodiment of this invention, and Figure 2 is a sectional view taken on the line 2—2 of Figure 1.

Referring to the drawing, the numeral 10 designates generally a valve housing embodying a substantially cylindrical body part 11 and a pair of radial bosses 12 and 13. A head plate 14 is secured to one end of the housing 10 and a second head plate 15 is secured to the opposite end of the housing 10. The housing 10 has rotatably mounted therein a valve plug 16 which is formed with a fluid passage 17 extending from the periphery of the plug and terminating at one end thereof coaxial with the center of the plug. The passage 17 is adapted to be positioned either in registry with the boss 12 or with the boss 13.

A split cylindrical liner 18 is disposed within the body 11 and is provided with outturned locking portions 19 engageable in a longitudinal keyway or recess 20 formed in the inner side of the body 11. The outturned portions 19 constitute locking keys which, when engaged in the keyway 20 hold the liner 18 against circumferential movement within the body 11. The liner 18 is formed of substantially thin metal which can be readily distorted so that when the liner 18 is pressed, as will be hereinafter described, against the periphery of the plug 16, the liner will be sealed with respect to the plug 16 at the particular point of pressure. The liner 18 is formed with a pair of diametrically opposed openings 21 and 22 which open into the interior of the bosses 12 and 13, respectively.

A plate 23 is disposed at the outer end of the boss 12, being seated in an annular recess 24 formed in the outer end of the boss 12. The plate 23 is provided with an inwardly tapering opening 25 coaxial with the opening 21 of the liner 18 and the plate 23 is tightly held against the boss 12 by means of a coupling member 26 which is secured by suitable fastening means (not shown) to the boss 12.

A sealing ring 27 is interposed between the inner portion of the connector 26 and the plate 23. As shown in Figure 2, the plate 23 is provided with an annular rib 28 engaging in an annular recess 29 formed in the inner portion of the connector 26. The plate 23 has secured thereto or formed integral therewith a cylindrical sleeve 30 extending from the small end of the opening 25 and terminating closely adjacent the periphery of the liner 18. A flexible bellows 31 engages about the sleeve 30 and is formed at its outer end with an annular flange 32 interposed between the shoulder 33 formed by the rabbet or annular recess 24 and the inner side of the plate 23.

The bellows 31 is provided at its inner end with an enlarged annular sealing ring 34 which bears against the periphery or outer side of the liner 18. The ring 34 is yieldingly held in engagement with the liner 18 by means of a spring 35. The spring 35 at its outer end bears against the inner side of the flange 32 of the bellows 31 and bears at its inner end against an inwardly projecting flange 36 which is carried by a slidable sleeve 37 slidably engaging within the interior of the boss 12.

The boss 13 has mounted therein a bellows 38 similar to the bellows 31 which engages about a cylindrical sleeve 39 carried by a plate 40 similar to plate 23. The remaining structure positioned in the boss 13 is identical in every respect with the structure mounted in the boss 12 and the detailed description of the elements in boss 12 will apply equally as well to the elements in boss 13.

The valve plug 16 is rotatably mounted within the housing 10 by means of anti-friction bearing members 41 and 42 which are positioned in annular bearing races 43 and 44 formed in the body 11 of the housing. The liner 18 as shown in Figure 1 is shorter in length than the length of the plug 16 so that the anti-friction members 41 and 42, which are balls, may contact with the periphery of the plug 16 adjacent the opposite ends thereof. A thrust anti-friction member 45 is interposed between one end of the plug 16 and the head or plate 15.

The plate 15 is sealed with respect to the body 11 by means of an annular sealing ring 46 engaging in an annular recess 47 formed in the body 11. The plate 15 has secured thereto a connector 48 which is secured to the plate 15 by means of a ring 49 having an inner flange 50 engaging an annular rib or flange 51 carried by the connector 48. A sealing ring 52 is interposed between the outer end of the plate 15 and the inner end of the connector 48.

The plate or head 14 has formed integral therewith a boss 53 through which a plug operating shaft 54 rotatably engages. The shaft 54 is formed at its inner end with a head 55 engaging in a recess 56 formed in the adjacent end of the plug 16 and a pin or key 57 is extended through the head 55 and engages in a diametrical opening 58 formed in the plug 16. The opening 58 communicates with a recess 59 formed in the plug 16 and opening through the adjacent end thereof, the purpose for which will be hereinafter described.

A flanged sleeve 60 is disposed about the shaft 54 adjacent the outer end thereof and engages within the opening 61 formed in the outer wall 62 of the boss 53. A washer 63 is positioned about the shaft 54 and bears against the inner end of the sleeve 60. The shaft 54 is sealed within the boss 59 by means of an annular sealing ring 64 which bears against the washer 63.

A cup-shaped annulus 65 engages about the sealing member 64 and is slidable on the shaft 54. The cup-shaped member 65 is pressed outwardly against the sealing member 64 by means of a spring 66 and the inner end of the spring 66 bears against a disc-shaped index plate 67. The plate 67 is interposed between the inner side of the head 14 and the adjacent end of the plug 16 and is formed with a plurality of outwardly offset detents 68 within which balls 69 engage. The plug 16 is provided with a plurality of openings 59 and ball cages 70 are seated in the openings 59. Each of the cages 70 has a spring 71 therein which presses against a ball 69 in a detent 68. The disc-shaped index plate 67 is held against rotation by means of outwardly bent fingers 72 which engage in recesses 73 formed in the inner side of the plate 14.

In the use of this valve structure, the boses 12 and 13 may be intake bosses whereas the connector 48 may be a central outlet although it will be understood that the flow of fluid through the valve structure may be reversed. The thickness of the liner 18 has been exaggerated and it will be understood that this liner is made of quite thin material having smooth inner and outer surfaces. The liner can be slightly distorted about the end of the plug passage 16 so as to thereby firmly seal the bellows with respect to the valve plug. In this manner it is not necessary to accurately machine the inner surface of the valve body 11 and the liner 18 may be so constructed as to eliminate any lapping of this member with respect to the valve plug 16.

The pressure of the sealing ring 34 against the outer surface of the liner 18 will provide a fluid-tight seal so that no fluid can leak out through the connection between the sealing ring 34 and the liner or between the liner and the peripheral surface of the valve plug 16. Through the provision of the anti-friction mounting of the valve plug, this element will not stick within the housing due to corrosion or other reasons so that a valve constructed according to this invention will be capable of being adjusted under varying operating temperature or other conditions. Through the provision of the keyway 20 in the valve body 11, the liner can be easily replaced in the event it is worn or becomes damaged and it is not necessary to use any special tools to insert the liner within the valve housing.

What I claim is:

1. A valve structure comprising a housing having a plurality of ports, a ported plug rotatable in said housing, a cylindrical liner in said housing about said plug and fixed relative to said housing, said liner having openings registering with said ports, and spring-pressed sealing means in said ports bearing against said liner about said openings for sealing said liner relative to said ports, said liner being of such construction that said sealing means will also seal said liner relative to said plug.

2. A valve structure comprising a housing having a plurality of ports, a plug in said housing, an apertured liner in said housing about said plug, means holding said liner against rotary movement, said liner having a length less than the length of said plug, anti-friction bearings in said housing engaging said plug at the opposite ends of said liner, said liner being formed of thin bendable material, and spring-pressed means carried by said housing in said ports for sealing said liner relative to said ports and said plug.

3. A valve structure comprising a housing having a plurality of ports, a plug in said housing, an apertured liner in said housing about said plug, means holding said liner against rotary movement, anti-friction bearings in said housing engaging said plug at the opposite ends of said liner, said liner being formed of bendable material, and spring-pressed means carried by said housing in said ports for sealing said liner relative to said ports and said plug.

GEORGE T. DOWNEY.

REFERENCES CITED

The following references are of record in the file of this patent:

UNITED STATES PATENTS

| Number | Name | Date |
|---|---|---|
| 690,232 | Chappell | Dec. 31, 1901 |
| 760,546 | Moreland | May 4, 1904 |
| 1,166,350 | Goudard | Dec. 28, 1915 |
| 2,138,530 | Wagner | Nov. 29, 1938 |
| 2,161,070 | McDonough | June 6, 1939 |

FOREIGN PATENTS

| Number | Country | Date |
|---|---|---|
| 12,002 | Germany | 1880 |
| 16,978 | Australia | Mar. 29, 1934 |
| 516,614 | Great Britain | Dec. 6, 1939 |